INVENTORS
GEOFFREY HERBERT HAINES
KEITH JAMES MITCHELL
RAYMOND HICKS
BY Fischstein, Fischstein & Ottinger
ATTORNEYS

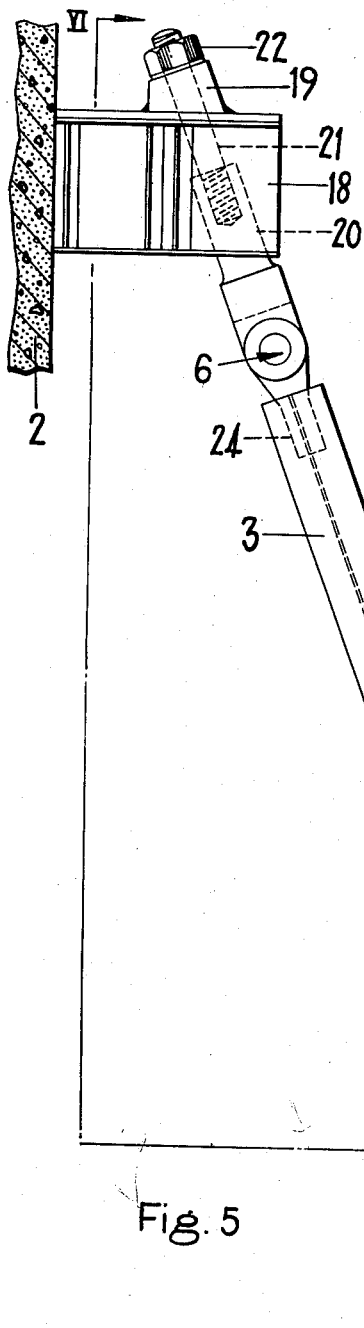
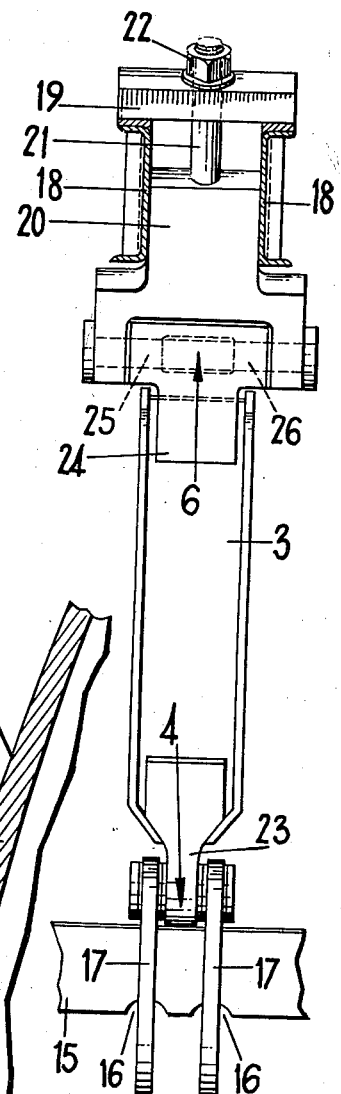
Fig. 5
Fig. 6

United States Patent Office 3,130,130
Patented Apr. 21, 1964

3,130,130
CORE SUPPORTING ARRANGEMENT FOR NUCLEAR REACTOR
Geoffrey Herbert Haines, Upminster, Keith James Mitchell, Higham, near Rochester, and Raymond Hicks, Bexleyheath, England, assignors to The General Electric Company Limited, London, and Simon-Carves Limited, Stockport, England
Filed Dec. 10, 1958, Ser. No. 779,326
Claims priority, application Great Britain Dec. 13, 1957
4 Claims. (Cl. 176—87)

This invention relates to nuclear reactors of the type in which nuclear fission is arranged to take place inside a pressure vessel, particularly a pressure vessel having radial symmetry about a vertical axis and containing fluid medium under pressure; the invention is particularly concerned with supporting arrangements for the pressure vessels of such reactors. A heterogeneous nuclear reactor of this type, for example, may include a core of moderating material provided with channels containing fuel elements of fissile material, the core being situated within, say a spherical pressure vessel and having channels through which fluid cooling medium under pressure may pass so as to abstract heat from the fuel elements. Such fluid cooling medium may then leave the pressure vessel and pass to heat exchangers, where the heat given up by the medium is used to generate steam for turbo-alternator plant.

It is an object of the present invention to provide a novel method of support for the pressure vessel in a nuclear reactor of this type.

According to the present invention, in a supporting arrangement for the pressure vessel of a nuclear reactor of the type specified, the pressure vessel is suspended from rigid support means by a plurality of suspension members attached to the pressure vessel at points distributed around the vessel and situated below the top of the vessel.

The rigid support means may comprise a plurality of distinct supports rigidly connected together, for example by a rigid foundation. The members may be pivotally attached at both ends to the pressure vessel and support means respectively.

Since the bending stress in the vessel at the points of attachment of the support members is great, it is necessary to provide means acting in opposition to this stress so as to minimise it as far as is practically possible. Such means may be provided by the pressure of the fluid medium within the pressure vessel upon a discontinuity in the vessel at each point of attachment. Alternatively, a nuclear reactor core within the pressure vessel may be suspended so as to constitute such means.

Figure 7:
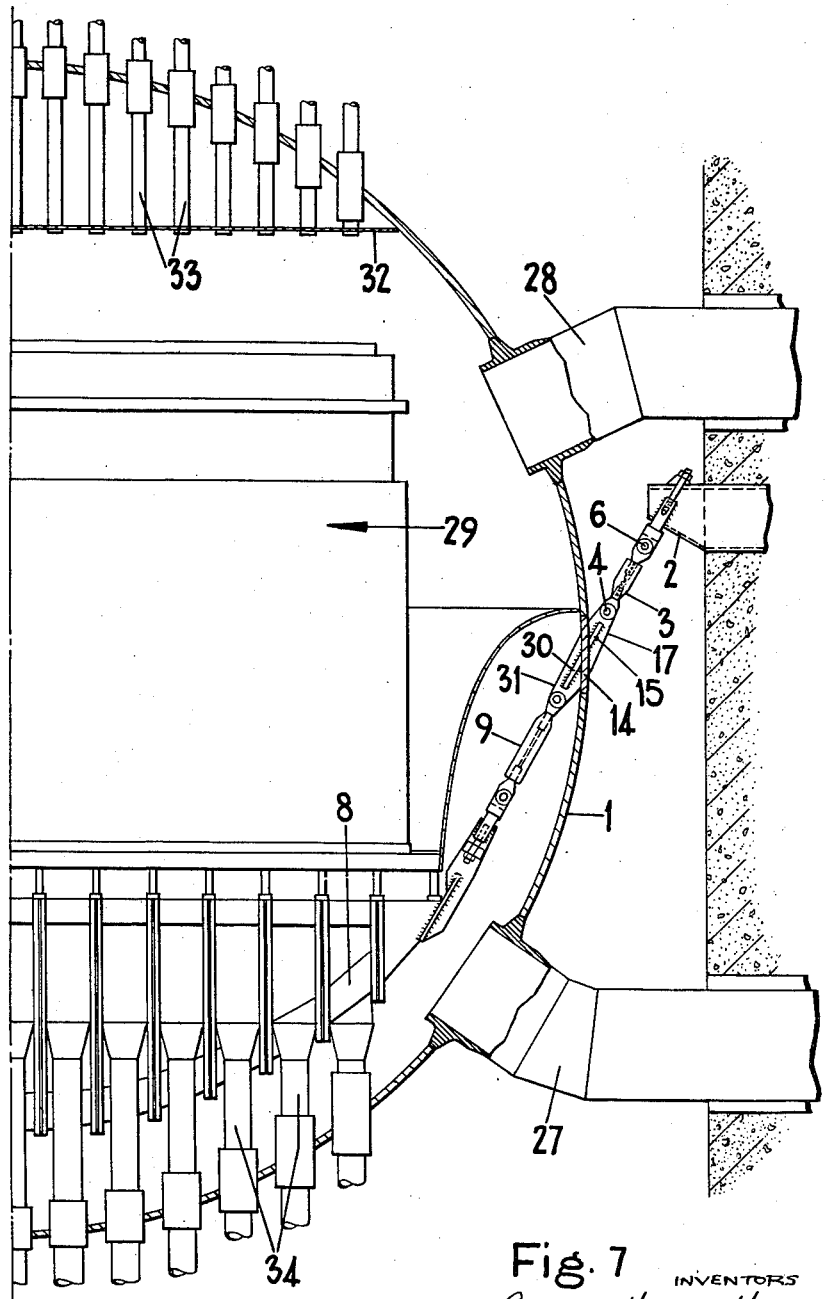

Supporting arrangements in accordance with the present invention will now be described by way of example with reference to FIGURES 1 to 7 of the accompanying drawings, in which: FIGURES 1 to 4 show in very diagrammatic form the arrangement of pressure vessel and its contents in each of four alternative forms of reactor; in which FIGURE 5 shows in detail a suspension member and its manner of attachment; in which FIGURE 6 is a view in the direction VI—VI of FIGURE 5; and FIGURE 7 is a half sectional elevation of yet another nuclear reactor supporting arrangement.

Figure 1:
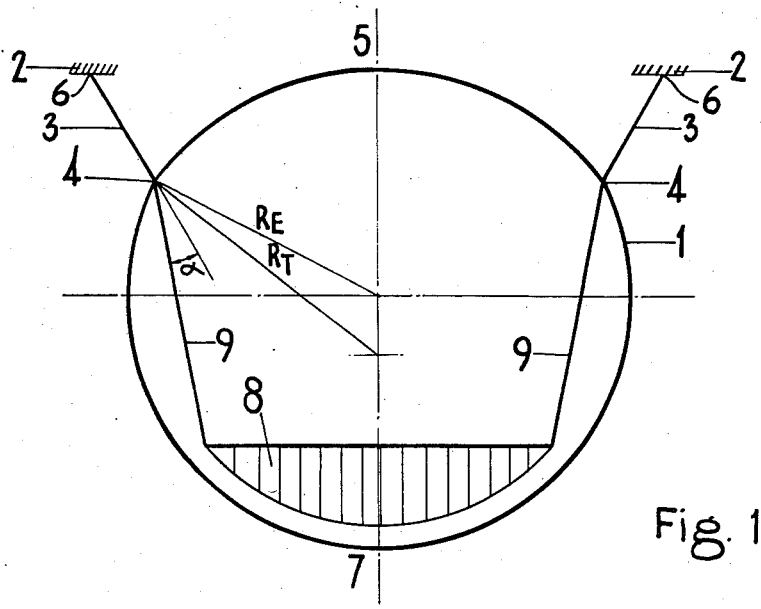

Referring now to FIGURE 1, the pressure vessel 1 of a gas-cooled graphite-moderated nuclear reactor designed to operate under pressure is approximately in the form of a sphere. The vessel 1 is suspended from a rigid support 2 by suspension members or tie rods 3; these members 3 are attached to the pressure vessel 1 at points 4 distributed around the vessel 1 below the top 5 thereof; the points of attachment 4 are in fact arranged at regular intervals around a horizontal circle on the surface of the vessel. The members 3 are pin jointed at their ends 4, 6 in a manner later described with reference to FIGURES 5 and 6, in order to eliminate any constraining effect of the members 3 on the vessel 1 due to, say, temperature increases or pressure loading.

The circle on which the points 4 fall represents an inwardly extending discontinuity in the meridianal curvature of the vessel 1. The part above this circle, including the top 5 of the vessel, is part of a sphere having a radius $R_T$ which is greater than the radius $R_E$ of the part below this circle and including the base 7 of the vessel. In effect, therefore, the sphere has a slightly flattened upper portion, and there is a continuous shoulder at the points 4 projecting outwards towards the members 3. The pressure of the gas within the vessel 1 upon this discontinuity or shoulder tends to straighten out the shoulder and restore a spherical form to the vessel; it therefore acts in opposition to the stress induced in the vessel at the points of attachment of the members 3 due to the weight of the vessel 1 and its contents, which latter stress tends to accentuate the shoulder. The discontinuity is chosen so that the stress in the vessel 1 due to the dead weight at the points 4 is minimised as far as is practically possible.

Inside the pressure vessel 1, a reactor core (not shown) is supported upon a structure 8 which is described in detail in our copending patent application Serial No. 779,327, now abandoned. This support structure 8 is suspended by further suspension members 9 from the vessel 1 at the points 4; if the unconstrained radial expansions of the support structure 8 are sufficiently large, the members 9 may be pin jointed at their extremities. As shown, the members 3 and 9 are not necessarily in line, the angle $\alpha$ represents a discontinuity which may be employed in conjunction with the discontinuity in the vessel 1 to control the bending stresses in the vessel 1 at the points 4. By choosing a suitable value for $\alpha$ it is possible to do without the discontinuity in the vessel 1, the system of suspension of the reactor core by the members 9 constituting means acting in opposition to the stress at the points 4 due to the dead weight of the vessel 1 and its contents.

Figure 2:
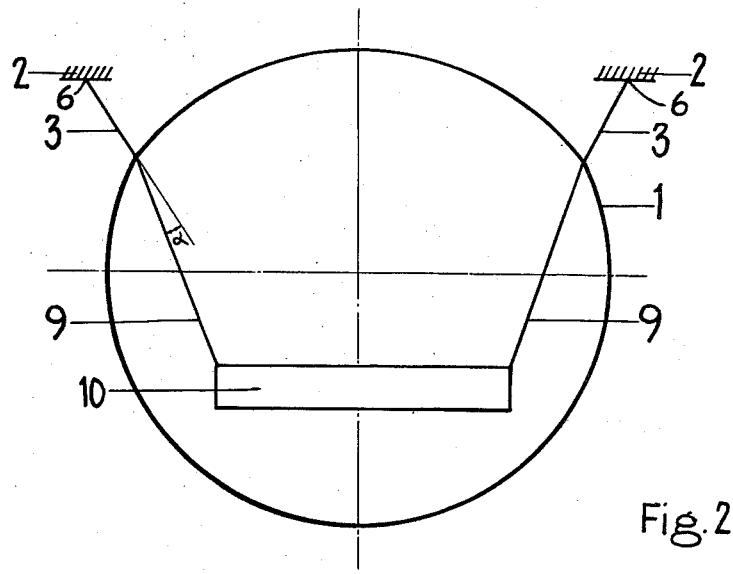
Figure 3:
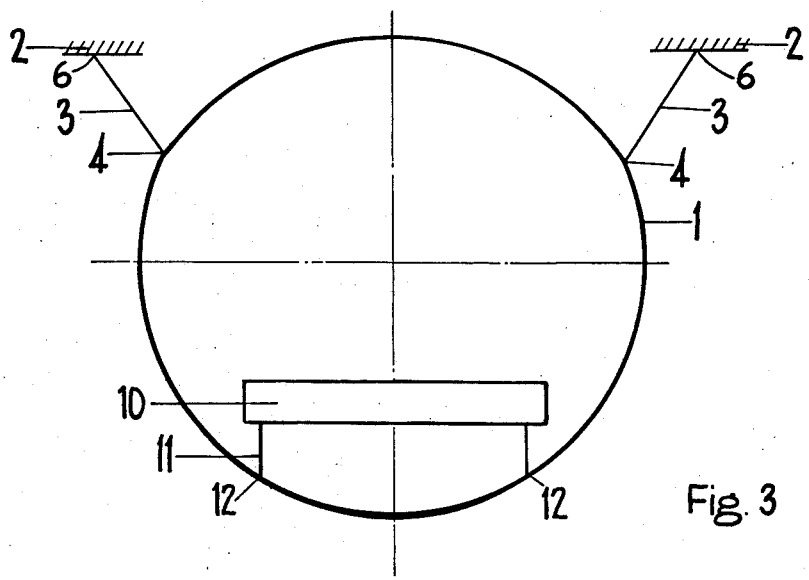
Figure 4:
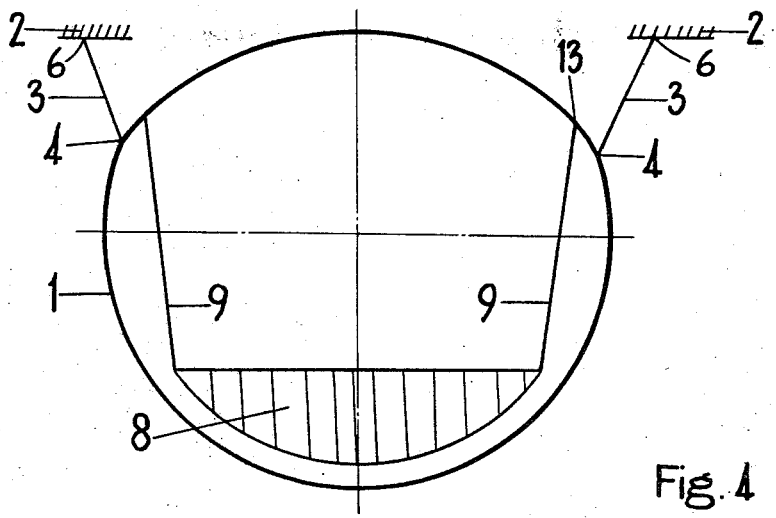

Although the suspension support system for the reactor core constituted by the members 9 is preferably used with a core support structure of the type shown at 8 in FIGURE 1, a conventional deep grillage support for the core may also be used as shown at 10 in FIGURE 2. Again, such a grillage 10 or core support structure 8 need not be suspended, but may be supported from beneath by a skirt 11 as shown in FIGURE 3. In the arrangement of FIGURE 3, there is a discontinuity at 12 where the inner supporting skirt 11 is carried by the vessel 1, in addition to the discontinuity at the points 4. This discontinuity at 12 acts in a similar way to that at the points 4; in this case, however, it will take the form of a shoulder projecting towards the interior of the vessel 1. It is also possible to employ two separate discontinuities in the system of FIGURE 1 in order to allow independent suspension support systems to be used for the vessel and core structure; this is shown in FIGURE 4, the additional discontinuity being at the points 13 where the members 9 are attached to the vessel 1.

Details of one form of suspension member 3, together with its manner of attachment to the pressure vessel and rigid support 2, are given in FIGURES 5 and 6. Referring now to these figures, the member 3 is of I-section and is pivotally attached at its ends 4, 6 to the vessel and support 2 respectively. A part 14 of the vessel 1 forms a support course running in a horizontal circle round the vessel, and has welded to it a short flange or diffusion skirt 15. This skirt is notched at regions 16 where pivot brackets 17 project from the support course 14, in order to avert possible cracking in the skirt. The rigid support 2 includes projecting channels 18 to which is welded a crosspiece 19; an upper pivot bracket 20 is welded to the channels 18 after preliminary adjustment by means of a bolt 21 and nut 22.

It will be seen that, while pivotal attachment of the member 3 occurs through another pivot piece 24 which has two bearings 25, 26. Each member 3 is therefore in effect an inverted A frame, and this feature of the design is important because it gives the suspension system as a whole the capacity to resist any horizontal loads which may be applied to the reactor vessel. Such loads may occur through a change in temperature of ducting attached to the pressure vessel due, for example, to cooling down of one or more of the gaseous cooling medium circuits. It is important that the vessel 1 should resist any such horizontal loads tending to alter its position, and in the present case such a load is transmitted to the rigid support 2 to an extent depending upon the axial stress in the member 3 and the distance between the two bearings 25, 26; the limiting horizontal component will be that load which causes all the axial stress in the member 3 to be transferred to one of the bearings 25, 26 instead of being shared between the two. The total horizontal load which may be transmitted through the vessel 1 is then the integrated total of the horizontal components transmitted by all the individual members 3.

A typical supporting arrangement in accordance with the invention is shown in half sectional elevation in FIGURE 7, the arrangement being essentially similar to that described with reference to FIGURE 1.

Referring to FIGURE 7, the pressure vessel 1 of a gas-cooled nuclear reactor is approximately spherical in shape and has ducts 27 and 28 for the coolant gas. In the upper part of the pressure vessel is a horizontal boron sandwich shield 32 through which pass distance tubes 33 for the control rods of the reactor. Charging tubes 34 for the fuel elements of the reactor are situated beneath the reactor core 29. The vessel is suspended from rigid support means 2 by suspension members 3, the members 3 being as described with reference to FIGURES 5 and 6, and being pin-jointed at their ends 4 and 6. Inside the vessel 1, the nuclear core 29 is supported upon a structure 8 which is described in detail in our copending parent application Serial No. 779,327. The support structure 8 is suspended by further suspension members 9 from the vessel 1.

The upper and lower parts of the pressure vessel 1 are connected by a part 14 to which they are welded, the part 14 forming a support course running in a horizontal circle around the vessel, and having an outer and an inner flange 15 and 30, respectively, and pivot brackets 17 and 31 to which the suspension members 3 and 9 are pivotally attached. It will be appreciated that the members 3 and 9 are essentially similar in construction and in their manner of attachment to the pressure vessel, and the rigid support 2 and support structure 3 respectively.

A nuclear reactor including a pressure vessel suspended in accordance with the invention has several advantages over a similar reactor in which the pressure vessel is supported from beneath by a rigid skirt or inverted A frames. In the first place, the members 3 are in tension rather than compression so that there is no tendency to buckle, as there would be if the pressure vessel were supported from below. Again, in the absence of a rigid base support and with a non-continuous suspension system of the type described, the pressure vessel has much greater freedom to expand or contract with temperature and pressure changes; this freedom is not hampered by a short diffusion skirt such as 15 above, since such a skirt is substantially at the same temperature as the pressure vessel. Due to this freedom of the vessel and the non-continuous nature of the suspension system the stresses induced in the vessel are relatively low, as compared with the local area of considerable stress which occur, for example, in the case of inverted A frames situated below the pressure vessel; it is rarely possible to calculate with accuracy the extent of such local stress, which brings with it the danger that the steel or other material of the pressure vessel may fail by brittle fracture. The suspended vessel is therefore inherently safer.

We claim:

1. A supporting arrangement for the core of a gas-cooled nuclear reactor, comprising a rigid support, a first plurality of suspension members depending from the support, a reactor-core-containing pressure vessel suspended by said members from the rigid support, the pressure vessel having radial symmetry about a vertical axis and the said members being spaced around the said axis and attached to the vessel at points distributed along a horizontal annular zone thereof, a second plurality of suspension members, a core support structure, and means suspending said core support structure from the inner surface of said vessel, said means comprising said second plurality of suspension members attached to the vessel at points distributed along said annular zone, said second plurality of suspension members being inclined to said first plurality of suspension members, said suspension means transmitting to the vessel a bending stress counteracting the bending stresses induced in the vessel at said annular zone by the dead weight of the vessel.

2. A supporting arrangement for the core of a gas-cooled nuclear reactor, comprising a rigid support, suspension members depending from the support, reactor-core-containing meridianally curved pressure vessel suspended by said members from the rigid support, said vessel having radial symmetry about a vertical axis and being formed with a horizontal annular zone around said axis defining an inwardly extending discontinuity in the meridianal curvature of the vessel, and a core support structure mounted within the vessel, said suspension members being spaced around said vertical axis and being attached to the pressure vessel at points distributed along said annular zone.

3. A supporting arrangement for the core of a gas-cooled nuclear reactor, comprising a rigid support, a first plurality of suspension members depending from said support, a reactor-core-containing meridianally curved pressure vessel suspended by said first plurality of suspension members from the rigid support, said vessel having radial symmetry about a vertical axis and being formed with first and second horizontal annular zones around said axis, said first annular zone defining an inwardly extending discontinuity in the meridianal curvature of the vessel, and said second annular zone defining an outwardly extending discontinuity in the meridianal curvature of the vessel, a second plurality of suspension members depending from the inner surface of the pressure vessel, and a core support structure suspended within the vessel by said second plurality of suspension members, said first plurality of suspension members being spaced around said axis and attached to the vessel at points distributed along said first annular zone, and said second plurality of suspension members being spaced around said axis and attached to the vessel at points distributed along said second annular zone, said first and second plurality of suspension members being disposed to the vessel for transmitting to the vessel bending stresses for counteracting the bending stresses induced in the vessel at said annular zone by the dead weight of the vessel and by the core support structure.

4. A supporting arrangement for the core of a gas-cooled nuclear reactor, comprising a rigid support, suspension members depending from the rigid support, a reactor-core-containing meridianally curved pressure vessel suspended by said members from the support, said vessel having radial symmetry about a vertical axis and being formed with first and second horizontal annular zones around said axis, said first annular zone defining an inwardly extending discontinuity in the meridianal curvature of the vessel, and said second annular zone defining an outwardly extending discontinuity in the meridianal curvature of the vessel, an annular supporting skirt attached to the inner surface of the vessel at said second annular zone, and a core support structure mounted on said skirt, said suspension members being spaced around said vertical axis and attached to the vessel at points distributed along said first annular zone.

References Cited in the file of this patent

UNITED STATES PATENTS

| | | |
|---|---|---|
| 1,131,102 | Aldrich | Mar. 9, 1915 |
| 1,678,988 | Maier | July 31, 1928 |
| 1,890,886 | Rather | Dec. 13, 1932 |
| 2,363,992 | Reiser | Nov. 28, 1944 |
| 2,564,843 | Hemp | Aug. 21, 1951 |
| 2,592,974 | Sulfrian | Apr. 15, 1952 |
| 2,709,057 | Gould | May 24, 1955 |
| 2,805,787 | Sherman | Sept. 10, 1957 |
| 2,823,822 | Altman | Feb. 18, 1958 |
| 2,863,815 | Moore et al. | Dec. 9, 1958 |
| 2,897,996 | Billig et al. | Aug. 4, 1959 |
| 2,916,179 | Monroe | Dec. 8, 1959 |
| 2,990,349 | Roman | June 27, 1961 |